United States Patent [19]

Basse et al.

[11] 3,873,931

[45] Mar. 25, 1975

[54] FM DEMODULATOR CIRCUITS

[75] Inventors: Philip Basse; Ronald J. Juels, both of Freeport, N.Y.

[73] Assignee: Comstron Corporation, Richmond Hill, N.Y.

[22] Filed: Oct. 5, 1973

[21] Appl. No.: 404,036

[52] U.S. Cl. ................. 329/122, 325/346, 329/167, 329/112, 331/23

[51] Int. Cl. ............................................. H03d 3/18

[58] Field of Search ................................ 331/23, 25; 329/122–126, 167, 112; 328/133; 325/419, 346, 344, 376; 179/15 BT

[56] References Cited

UNITED STATES PATENTS

| | | | |
|---|---|---|---|
| 3,469,198 | 9/1969 | Madsen | 325/346 X |
| 3,537,017 | 10/1970 | Judge | 179/15 BT X |
| 3,588,730 | 6/1971 | Schreuer et al. | 331/25 X |
| 3,743,775 | 7/1973 | Hutchinson et al. | 329/123 X |
| 3,745,255 | 7/1973 | Fletcher et al. | 325/419 X |

*Primary Examiner*—Alfred L. Brody
*Attorney, Agent, or Firm*—Arthur L. Plevy

[57] ABSTRACT

There is disclosed an FM demodulator including first and second phase locked loops for demodulating a first and second FM signal contained in a composite signal. The loops employ frequency feedback whereby one loop controls the input to the other loop and vice versa to assure that said first and second signals are separately demodulated relatively independent of their power ratio as present in said composite signal.

9 Claims, 1 Drawing Figure

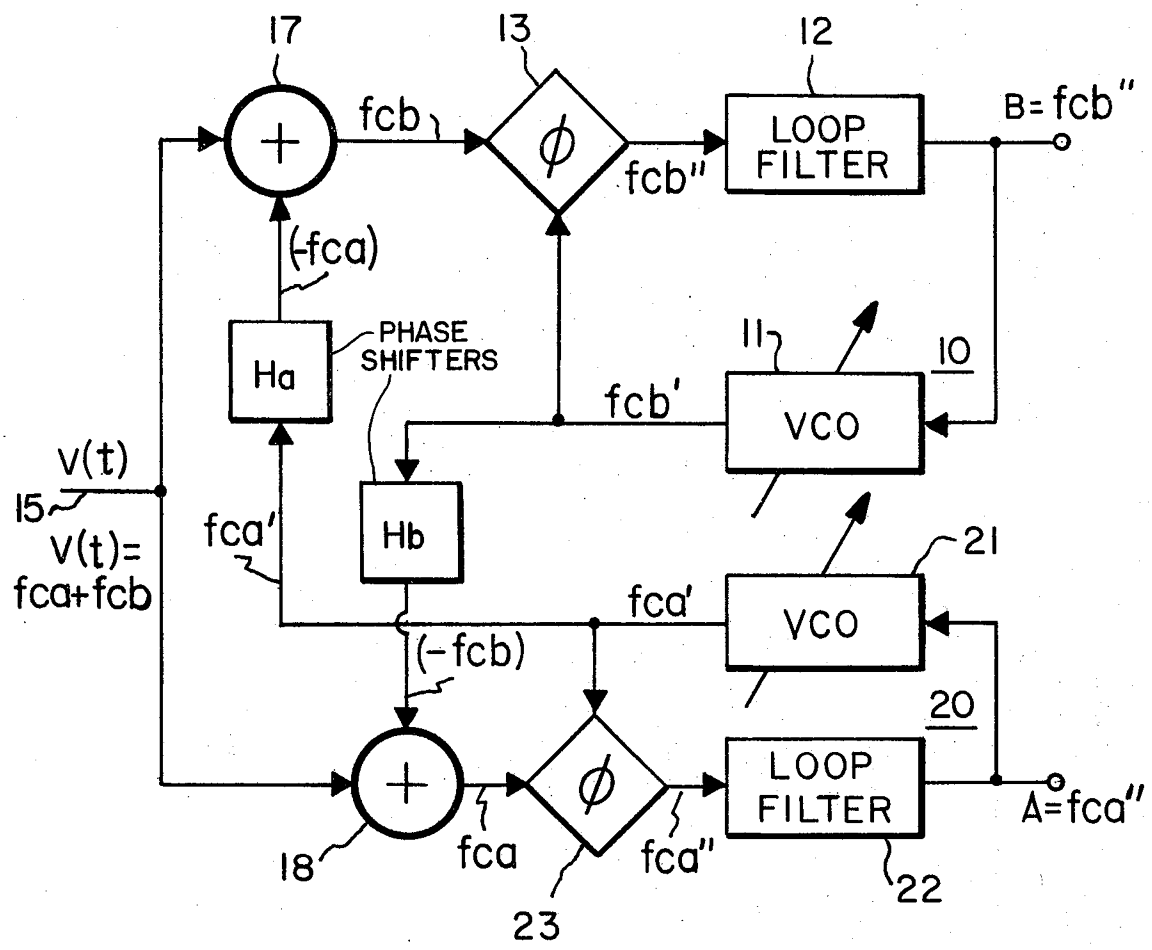
17
13
12
fcb
LOOP FILTER
B=fcb''
fcb''
(-fca)
PHASE SHIFTERS
11
10
Ha
fcb'
VCO
v(t)
15
Hb
v(t)= fca+fcb
fca'
21
fca'
VCO
(-fcb)
20
LOOP FILTER
A=fca''
18
fca
fca''
22
23

FM DEMODULATOR CIRCUITS

BACKGROUND OF INVENTION

This invention relates to demodulators for frequency modulated signals and more particularly to a demodulator capable of retrieving a signal in the presence of a strong interfering signal.

The capture performance or the ability of an FM receiver to reject interference in the form of unwanted signals has become an important requirement in the communications field.

The prior art has proposed many solutions to the problem and a great deal of literature exists.

The two main approaches that exist in the prior art follow the teachings or Arguimbau and Granlund as one approach and Baghdady as the other. The work of Arguimbau and Granlund is evidenced by U.S. Pat. No. 2,674,690 issued on Apr. 5, 1954 and various articles written by these authors. The other approach appears in an article entitled "Theory of Stronger-Signal Capture in FM Reception" by Elie J. Baghdady in the Proceedings of the I.R.E., Volume 46, pages 728 to 738.

Thus, the prior art discusses the Granlund discriminator as a fast acting wideband unit which can accommodate wide frequency variations and hence alleviate the capture problem. The approach suggested by Baghdady results in narrow band limiting which in turn is used to reduce the band width requirements of the demodulator.

In any event, the prior art is aware that the capture or interference rejection characteristics of an FM demodulator reside in its ability to follow instantaneous frequency variations of the resultant of two input signals. When these excursions can be followed, the average frequency obtained from the demodulator will be exactly that of the desired or stronger signal.

Hence, the prior art was and is concerned with responding to a desired signal defined as the stronger signal. It is apparent that the stronger signal need not be the desired signal. It is also apparent that either of two signals need not be undesired. For example, given two interfering signals, it is quite conceivable that both signals may contain necessary information and therefore both be desirable.

Of particular concern is the case where the interfering signal and the desired signal are near the same frequency. In this case, the conventional receiver as indicated will always be captured by the stronger signal or the signal with the most power. The so-called "hidden" signal, which may be the desired signal, will be lost if the power is lower than the interfering signal.

It is therefore an object of the present invention to provide an improved demodulator capable of demodulating either one of two FM signals relatively independent of signal strength.

DESCRIPTION OF PREFERRED EMBODIMENT

A demodulator capable of demodulating a first and a second FM signal contained in a composite signal, where either signal may be desirable or interfering, comprises first and second phase locked loops wherein said first loop has input means responsive to said composite signal and an output capable of providing said first signal, said second loop having an input responsive to said composite signal and an output capable of providing said second signal and means coupling said first loop to said input of said second loop and said second loop to the input of said first loop to cause each loop to provide said associated FM signal independent of the power ratio between the first and second signals as contained in said composite signal.

BRIEF DESCRIPTION OF FIGURE

The sole FIGURE is a block representation of the FM demodulator according to this invention.

DETAILED DESCRIPTION OF FIGURE

Before proceeding in describing the invention, it is noted that a basic constituent or component part of the invention is a phase locked loop. Basically, the phase locked loop is well known in the prior art and consists of a voltage control oscillator, a phase detector and a loop filter. The combination has been used as a demodulator for frequency or phase modulated carrier signals. There is a great deal written in the literature explaining the operation and characteristics of the phase locked loop. For an example of a suitable article, see "Design and Performance of Phase-Lock Circuits Capable of Near Optimum Performance Over a Wide Range of Output Signals and Noise Levels" (I.R.E. Transactions — IT March, 1955, pages 66 to 76) by R. Jaffee and E. Rechtin.

Shown in the figure are two phase locked loops designated respectively as 10 and 20. Each loop consists of a voltage controlled oscillator or VCO 11 and 21, a loop filter 12 and 22 and a phase detector 13 and 23.

The phase locked loops 10 and 20 as will be seen enables the demodulation of a desired and hidden signal which are interfering.

An input terminal 15 is shown and an input signal designated as $V(t)$ is applied thereto.

The input signal is a frequency modulated signal which, for the purposes of explaining the invention, contains a first carrier *fca* modulated by an information signal A and a second carrier fcb modulated by an information signal B.

It is seen that the input signal $V(t)$ is applied to one input of adders or summers 17 and 18 associated with each phase locked loop 10 and 20 as will be explained. It is also understood that the adders 17 and 18 may have attenuators or gain controls as well as impedance matching networks coupled to the input, and not shown. Such techniques are well known as are summers or adders using operational amplifiers or other well known circuit configurations. The adders 17 and 18 are linear adders and may merely be a resistor network or an operational adder circuit. Each adder or mixer 17 and 18 has another input derived from the opposite phase locked loop. This adder 17 has an input taken via a filter or phase shift network designated as $H_a$ and derived from phase locked loop 20 via the output of the VCO 21. Similarly, adder 18 receives a signal from VCO 11 of loop 10 via the network referred to as $H_b$.

The operation is as follows. Assume that the two carrier frequencies are derived from different signal sources.

The oscillators 11 and 21 are therefore set to the selected carrier frequency, the oscillators 11 and 21 would correspond to the local oscillator in a radio receiver and, of course, are variable to accommodate a wide range of frequencies.

Initially, assume that the loop 20 is locked and therefore VCO 21 is locked to the fca carrier by means of the loop. Hence, as shown, the output of VCO is *fca*. It is, of course, understood that the output of VCO 21 is 90° out of phase with the fca carrier, and hence is designated as $fca^1$. Since we assume that the loop 20 is locked and $fca^1$ is being generated by oscillator 21, we must assume that *fca* is being developed at the output of the adder 18 as shown. Therefore, fca is being applied to one input of the phase detector 23. Since the other input contains $fca^1$, the output of the detector will be the demodulated signal $fca^{11}$ or A as further processed via the loop filter 22. If this is correct, then the VCO 21 will continue to be locked at $fca^1$ in order to produce the desired output of $fca^{11}$ from the adder 18.

Accordingly, let us assume that loop 10 is also locked and that the output of oscillator 11 is $fcb^1$ which is 90° out of phase with the fcb signal. In this case, as above, the input to phase detector 13 has to be *fcb* which together with $fcb^1$ at the other input provides the information signal $fcb^{11}$ or B at the output of the loop filter 12.

In order for the above operation to be feasible, it is understood that the output of mixers or adders 17 and 18 were assumed to be *fcb* and *fca*, respectively. Once this output is available then the locking and operation of the loops 10 and 20 are obvious and understood.

As indicated, mixer 17 receives at one input the input signal $V_t$ which includes *fca* and *fcb*. The other input is derived from module $H_a$ which is a Hilbert transform filter or a 90° phase shifter. Thus, $fca^1$ which supposedly was available from VCO or oscillator 21 is applied to filter $H_a$ and is shifted by another 90° to therefore obtain the *fca* signal at 180° out of phase with the original *fca* signal. Hence, the output of mixer 17 to a good approximation is in fact *fcb* as $(fcb + fca - fcb = fcb)$ and hence the assumption above is correct. It can be seen that the same theory applies for the output of mixer or adder 18 which is *fca*, as $fca + fcb - fcb = fca$. Thus, the loop is stable and the outputs are A and B or the modulated information impressed on the interfering carriers.

It is, of course, understood that the discussion and operation involves FM signals. Hence, the inputs to the adders can be limited as the inputs to the $H_a$ and $H_b$ modules so that addition can be maintained without concern of amplitude variations. In any event, gain and phase controls can be conventionally implemented to afford timing and optimum circuit operation. It is also noted that the entire phase locked loops as 10 and 20 are available as integrated circuits and have the VCO, filter and phase detector components on single chips.

It is also seen that the concept will work even for conditions where the carriers are not equal but are interfering or spread apart. This merely requires the setting of oscillators 11 and 21 at different frequencies.

It is also understood that the Hilbert transforms to obtain a 90° phase shift can be implemented by multivibrators and similar digital logic techniques.

The above structure operated and a desired signal was extracted from a composite input signal $V_t$; where the interfering to desired power ratio exceeded 20 decibels. In one instance, both carriers *fca* and *fcb* were selected at 455 KHz and were respectively modulated by 1 and 2 KHz information signals. The outputs with the circuits shown was a 1 KHz signal at B and a 2 KHz at A. With the adders 17 and 18 operating without the inputs from $H_a$ and $H_b$ both loops 10 and 20 were captured by the stronger signal and the outputs were the same being the information signal associated with the stronger signal.

It is also seen that the concept can be used for more than two loops or for more than two interfering signals by further cross coupling loops and so on.

What is claimed is:

1. Apparatus for demodulating first and second FM signals contained in a composite signal, said composite signal characterized in that said first and second FM signals each have their own separate and independent carrier frequency, comprising:

a. first means for providing at an output a third FM signal substantially related to said first FM signal but of opposite phase, b. second means for providing at an output a fourth FM signal substantially related to said second FM signal but of opposite phase, and c. means responsive to said composite signal and said third and fourth signals to provide at one output said first FM signal and at separate output said second FM signal.

2. The apparatus according to claim 1 wherein said first and second means each include a phase locked loop, each loop including a voltage controlled oscillator, a phase detector and a loop filter arranged in a demodulator configuration.

3. The apparatus according to claim 1 wherein said means responsive to said composite signal and said third and fourth signals comprises a first and a second adder circuit, each having one input terminal responsive to said composite signal, said first adder having another input terminal responsive to said third signal to provide at an output said second FM signal, said second adder having another input terminal responsive to said fourth FM signal to provide at an output said first FM signal.

4. The apparatus according to claim 2 further including a first feedback path coupling said first loop to said second loop and a second feedback path coupling said second loop to said first loop.

5. Apparatus for demodulating first and second FM signals contained in a composite signal, said composite signals characterized in that said first and second FM signals each have their own separate and independent carrier frequency, comprising:

a. first and second phase locked loop each capable of responding to said first and second FM signals, b. first and second adding means each having first and second input terminals and an output terminal, said output terminal of one of said adding means coupled to one of said loops and said output terminal of said other adding means coupled to said other loop, one of said input terminals of each responsive to said composite signal and said other terminal coupled to a different one of said phase locked loops to cause said first loop to demodulate only said first FM signal and said second loop to demodulate only said second FM signal, and c. means coupled to said first and second loops for utilizing said first and second FM signals independently of one another.

6. Apparatus for responding to a first FM signal in the presence of a second and interfering FM signal wherein said second interfering FM signal may have a carrier frequency substantially equal to the carrier of said first FM signal, comprising:

a. first and second phase locked loop circuits, said first loop circuit including a first oscillator capable of providing a first signal having a frequency selected according to said first FM signal, said second loop including a second oscillator capable of providing a second signal having a frequency selected according to said second FM signal.

b. a first and second summing circuit having a common input terminal responsive to said first and second FM signals and each having another input terminal, each of said summing circuits having an output terminal, said output terminal of said first summing circuit coupled to said first phase locked loop and said output of said second summing circuit coupled to said second phase locked loop, c. first means for applying the oscillator signal of said first loop circuit to said input terminal of said second summing circuit to cause said summing circuit to provide said first FM signal at an output, and d. second means for applying the oscillator signal of said second loop circuit to said input terminal of said first summing circuit to cause said summing circuit to provide said second FM signal at an output.

7. The apparatus according to claim 6 wherein said first and second means include a phase shifting network capable of shifting said oscillator signals a predetermined number of degrees.

8. A demodulator for demodulating a first and second FM signal contained in a composite signal, said composite signal characterized in that first and second FM signals each have their own separate and independent carrier frequency, comprising:

a. a first adding circuit having first and second input terminals and an output terminal, said first input terminal responsive to said composite signal, b. a second adding circuit having first and second input terminals and an output terminal, said first input terminal responsive to said composite signal, c. a first phase locked loop including a first phase detector having one input coupled to the output of said first adding circuit and another input responsive to a first oscillator included in said loop, said loop capable of providing at an output a demodulated version of said first FM signal, d. a second phase locked loop including a second phase detector having one input coupled to the output of said second adding circuit and another input responsive to a second oscillator included in said loop, said loop capable of providing at an output a demodulated version of said second FM signal, e. first means coupling said first oscillator to said second input terminal of said second adding circuit to cause said second loop to provide said demodulated second FM signal, and f. second means coupling said second oscillator to said second input terminal of said first adding circuit and cause said first loop to provide said demodulated first FM signal.

9. The demodulator according to claim 8 wherein said first and second means include a phase shift network for shifting the phase of said oscillator signal a predetermined number of degrees.

* * * * *